US009609080B2

(12) United States Patent
Tsai et al.

(10) Patent No.: US 9,609,080 B2
(45) Date of Patent: Mar. 28, 2017

(54) SYSTEMS AND METHODS FOR DEVICE IDENTITY DELEGATION FOR APPLICATION SOFTWARE

(71) Applicant: Cyberlink Corp., Shindian, Taipei (TW)

(72) Inventors: Yi-Lung Tsai, Kaohsiung (TW); Shan-Chun Pan, Miaoli County (TW); Dong-Yu Liu, Pingzhen (TW)

(73) Assignee: CYBERLINK CORP., Shindian, Taipei (TW)

( * ) Notice: Subject to any disclaimer, the term of this patent is extended or adjusted under 35 U.S.C. 154(b) by 266 days.

(21) Appl. No.: 14/187,428

(22) Filed: Feb. 24, 2014

(65) Prior Publication Data

US 2014/0280508 A1    Sep. 18, 2014

Related U.S. Application Data

(60) Provisional application No. 61/777,491, filed on Mar. 12, 2013.

(51) Int. Cl.
*G06F 15/16* (2006.01)
*H04L 29/08* (2006.01)

(52) U.S. Cl.
CPC ........ *H04L 67/303* (2013.01); *H04L 67/2819* (2013.01)

(58) Field of Classification Search
CPC ....................................................... H04L 67/10
See application file for complete search history.

(56) References Cited

U.S. PATENT DOCUMENTS

| 8,649,768 | B1 * | 2/2014 | Gaddam | H04W 12/06 455/411 |
| 8,886,773 | B2 * | 11/2014 | Papakostas | H04L 29/12018 709/202 |
| 2005/0005098 | A1 * | 1/2005 | Michaelis | G06F 21/51 713/156 |
| 2005/0091507 | A1 * | 4/2005 | Lee | H04L 63/10 713/182 |
| 2005/0246523 | A1 | 11/2005 | Mauro et al. | |
| 2006/0048132 | A1 | 3/2006 | Chen et al. | |
| 2006/0242201 | A1 * | 10/2006 | Cobb | G06Q 30/02 |
| 2007/0083675 | A1 * | 4/2007 | Vemulapelli | G06Q 10/107 709/246 |
| 2008/0114649 | A1 * | 5/2008 | Swirsky | G06Q 30/02 705/14.64 |
| 2009/0002333 | A1 * | 1/2009 | Maxwell | G06F 3/04883 345/173 |
| 2010/0325735 | A1 | 12/2010 | Etchegoyen | |
| 2012/0041844 | A1 * | 2/2012 | Shen | G06Q 30/06 705/26.61 |

* cited by examiner

*Primary Examiner* — Moustafa M Meky
*Assistant Examiner* — Sm Z Islam
(74) *Attorney, Agent, or Firm* — McClure, Qualey & Rodack, LLP

(57) ABSTRACT

A method implemented in a delegating server for binding a device identity to a software application comprises receiving registration data from a client device executing a software application and assigning a device identifier to the client device and registering the client device with the delegating server based on the registration data. The method further comprises facilitating communication between the client device and the service provider based on the device identifier, wherein the delegating server is located between the client device and the service provider.

19 Claims, 11 Drawing Sheets

SYSTEMS AND METHODS FOR DEVICE IDENTITY DELEGATION FOR APPLICATION SOFTWARE

CROSS-REFERENCE TO RELATED APPLICATION

This application claims priority to, and the benefit of, U.S. Provisional Patent Application entitled, "Device Identity Delegating Method for Application Software," having Ser. No. 61/777,491, filed on Mar. 12, 2013, which is incorporated by reference in its entirety.

BACKGROUND

Device identity generally refers to representation of an individual element to certain service providers. In the case of hardware, each apparatus is pre-installed with a unique device identity before being shipped to the market and ultimately to the consumer. However, in the field of software development, constructing application software with a unique device identity for each and every consumer is not feasible. There are two major problems with using device identities in the field of software development. The first relates to binding device identities to software clients, and the other relates to managing these created relationships to ensure device identities are properly used.

SUMMARY

Briefly described, one embodiment, among others, is a method implemented in a delegating server for binding a device identity to a software application that comprises receiving registration data from a client device executing a software application, assigning a device identifier to the client device and registering the client device with the delegating server based on the registration data, and facilitating communication between the client device and the service provider based on the device identifier, wherein the delegating server is located between the client device and the service provider.

Another embodiment is a method implemented in a delegating server for binding a device identity to a software application that comprises receiving data from a client device intended for a service provider, the data including a user identifier and a device identifier associated with the client device. The method further comprises determining whether a virtual device environment exists based on the user identifier and the device identifier associated with the client device. Responsive to determining that the virtual device environment does not exist, an error message is transmitted to the client device indicating denial of service from the service provider. Responsive to determining that the virtual device environment exists, the data is forwarded to the service provider and a response generated by the service provider is forwarded to the client device.

Another embodiment is a system for providing services to a client device that comprises a processor. The system further comprises a client interface executed in the processor for receiving registration data from a client device executing a software application, a registration module executed in the processor for assigning a device identity to the client device and for registering the client device with the delegating server based on the registration data, and a service gateway executed in the processor for enabling communication of data between the client device and the service provider, wherein the service gateway forwards data between the client device and the service provider upon the server interface communicating the device identity to the service provider.

Another embodiment is a method implemented in a delegating server for binding a device identity to a software application that comprises receiving a device transfer request from a first client device executing a software application, the device transfer request corresponding to a second client device, wherein the device transfer request comprises an identifier corresponding to the user and information corresponding to hardware in the second client device. Based on the device transfer request, a determination is made on whether the first client device is registered with the delegating server. In response to the first client device being registered, hardware information corresponding to the first client device is obtained. The method further comprises overwriting the hardware information corresponding to the first client device with hardware information corresponding to the second client device and facilitating communication between the second client device and the service provider to provide a service to a user of the second client device via the software application, the delegating server being located between the service provider and the second client device.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1A:
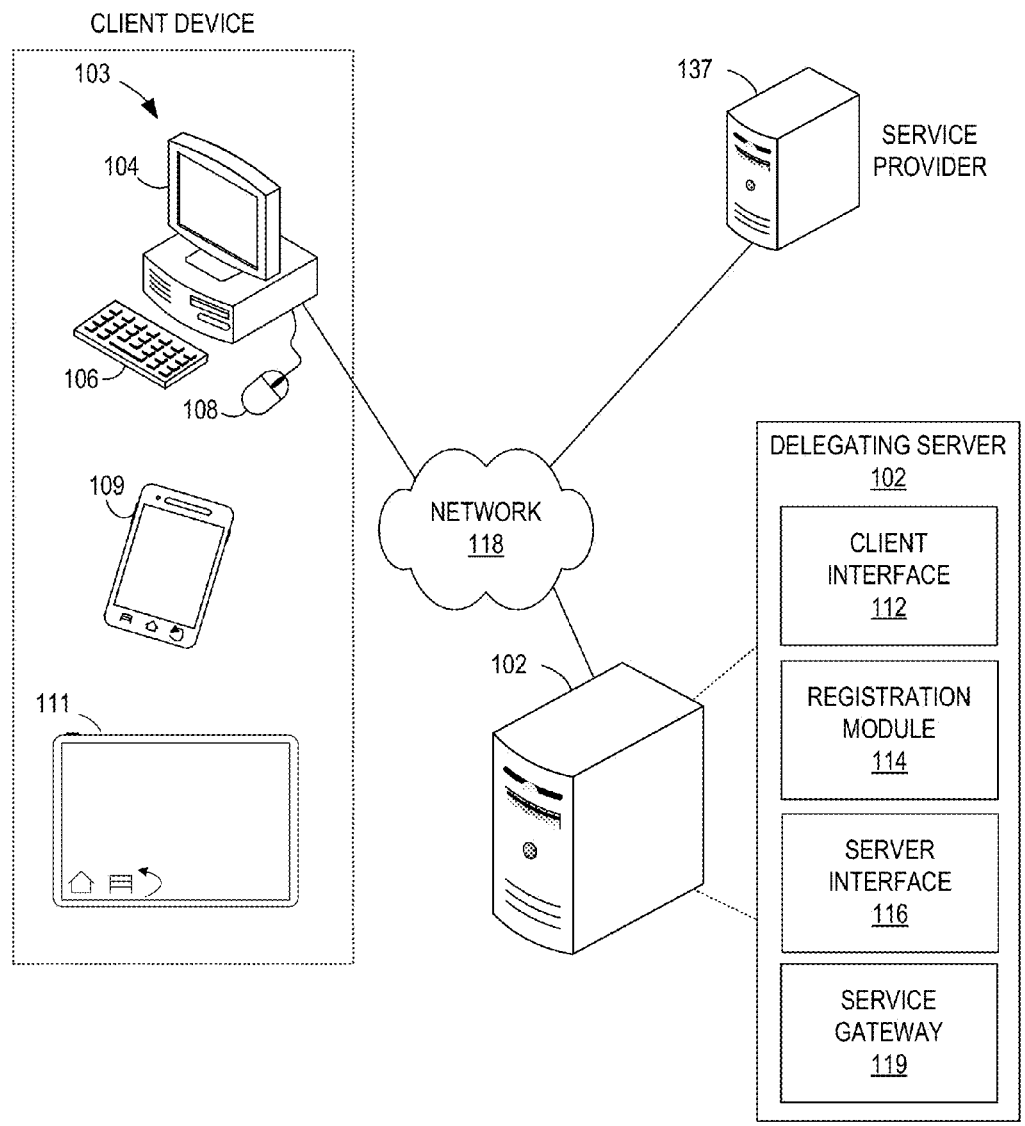
FIG. 1A is a block diagram of a system in which embodiments of a virtual device environment may be implemented in accordance with various embodiments of the present disclosure.

Application software is typically sold to consumers separately from computers, and users are allowed to install the application software on any computer. Therefore, it is difficult to bind device identities to either software or hardware. To address such challenges, various embodiments are directed to a delegating system that preserves all device identities and provides a means for dynamically binding device identities to both software and hardware. The relationships are formed in a "virtual device environment" and are managed by the disclosed delegating system. In addition, the delegating system performs delegating methods for software applications executing on client devices to communicate with service providers.

When a user installs the application software on a computer, the computer is included in a virtual device environment belonging to the user. Once the virtual device environment is established, the user is able to communicate with service providers from the software client via the proposed delegating system. Since the device identity is dynamically bound to software and hardware, the user is allowed to update his computer information to the virtual device environment.

Various embodiments are directed to a virtual device environment that manages device identities for users on the delegating server. The delegating server also provides a device transfer method that replaces the original computer in the same virtual device with another computer if the user elects to execute the software application on a different machine. Delegating methods are disclosed for preserving device identities on a delegating server for application software. After registering a software application executing on a client device with the delegating server, the delegating server communicates with service servers for that client device with the bound device identity. In addition, a transfer process is disclosed for exchanging computers in the virtual device environment.

The delegating techniques disclosed provide an effective means for binding device identities to computing devices in the application software domain. In the illustrations provided, a user associated with a single client device in communication with a delegating server and single service provider is depicted. However, this is not meant to be limiting and other configurations involving multiple client devices, delegating servers, and client servers may be incorporated for other embodiments. A description of a system for providing a virtual device environment to facilitate communication between a service provider and a client device executing application software is now described followed by a discussion of the operation of the components within the system.

FIG. 1 is a block diagram of a delegating server 102 in which embodiments disclosed herein may be implemented. The delegating server 102 may be embodied, for example, as a desktop computer, computer workstation, or other computing platform and is in data communication with one or more client devices 103 by way of a network 118. The network 118 includes, for example, the Internet, intranets, extranets, wide area networks (WANs), local area networks (LANs), wired networks, wireless networks, or other suitable networks.

The delegating server 102 may comprise, for example, a server computer or any other system providing computing capability. Alternatively, delegating server 102 may include a plurality of computing devices that are arranged, for example, in one or more server banks or computer banks or other arrangements. The components executed on the delegating server 102 include, for example, a client interface 112, a registration module 114, a server interface 116, a service gateway 119, and other applications, services, processes, systems, engines, or functionality not discussed in detail herein.

The client interface 112 is executed to facilitate communication between the delegating server 102 and the client device 103 via the network 118 and receives such data as registration data, unregistration requests, device transfer requests, and so on from the client device. The client interface 112 may also receive process data originating from one or more software applications executing on the client device 103, where the process data is intended for the service provider 137.

The registration module 114 is executed to process registration data received from a client device 103 and validate the user of the client device 103 based on the registration data. Based on the results of the validation process, the registration module 114 may generate a unique device identifier for the client device 103 to thereby establish a virtual device environment for the client device 103.

The server interface 116 is executed to communicate the device identifier associated with the client device 103 to the service provider 137. The service gateway 119 is executed to facilitate communication between the service provider 137 and the client device 103 once a virtual device environment has been established for the client device 103. The service gateway 119 forwards data back and forth between the client device 103 and the service provider 137. For example, the service gateway 119 may forward such data as process data generated by the service provider 137 in response to process data previously sent from the client device 103. First, the client device 103 sends information relating to a request to the delegating server 102. The information may comprise, for example, a license request to review a movie protected with digital rights management (DRM).

The delegating server 102 then wraps, using a device identifier associated with the client device 103, the information to form a request in a format that is compatible with the service provider 137. The delegating server 102 then sends the generated request to the service provider 137, and the service provider 137 transmits a response. Upon receiving the response from the service provider 137, the delegating server 102 unwraps the response, where the unwrapping process is also performed using the device identifier. The unwrapping process is performed to obtain data, which is then forwarded by the delegating server 102 to the client device 103. The unwrapped data may comprise, for example, license data from the service provider 137 necessary for allowing the client device to decrypt the DRM-protected movie for playback purposes. In this regard, the wrapping and unwrapping operations may be performed by the delegating server 102.

The client device 103 may be embodied, for example, as a desktop computer, computer workstation, laptop, a smartphone 109, a tablet PC 111, or other computing platform and includes a display 104 and may include such input devices as a keyboard 106 and a mouse 108. For embodiments where the client device 103 is embodied as a smartphone 109 or a tablet PC 111, the user may interface with the delegating server 102 via a touchscreen interface (not shown). The service provider 137 may be embodied, for example, as a desktop computer, computer workstation, or other computing platform and is in data communication with one or more client devices 103 via the delegating server 102 by way of the network 118.

Figure 1B:
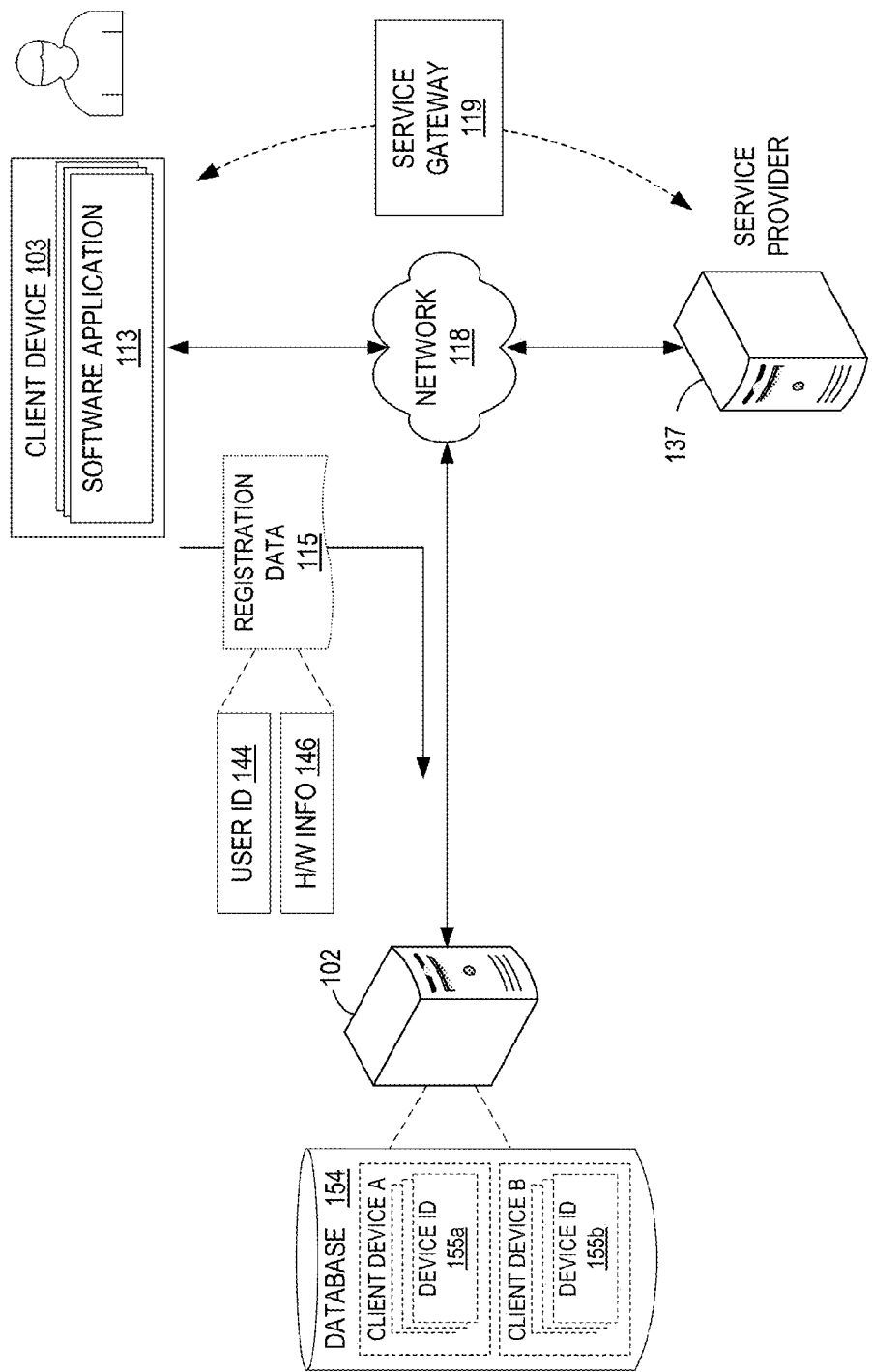
FIG. 1B illustrates the registration process involving the delegating server and the client device of FIG. 1A in accordance with various embodiments of the present disclosure.

Reference is made to FIG. 1B, which illustrates the signal flow for the registration process involving the delegating server 102 and the client device 103 of FIG. 1A. As shown, the client device 103 executes application software 113, which provides one or more services to a user of the client device 103 by communicating with a service provider 137. To establish communication with the service provider 137, the client device 103 sends registration data 115 to the delegating server 102, where the registration data 115 comprises a user identifier 144 associated with the user or user account and hardware information 146 associated with the client device 103.

The user identifier 144 certifies that the user owns the rights to use the application software 113 and communicate with the service provider 137. For some embodiments, the user identifier 144 may comprise a unique textual or alphanumeric string corresponding to the user of the client device 103. For example, the user identifier 144 may comprise some type of product key associated with the client device 103. The unique device identifier is allocated by the delegating server 102 and is generally used by the service provider 137 to distinguish between different client devices. To further illustrate, consider the following scenarios. In a first scenario, suppose a client device registers with the delegating server as a virtual device for the first time. In this scenario, the delegating server 102 assigns a unique device identifier to that "virtual device" to serve as a representation to the service provider 137.

In a second scenario, suppose that an unregistered client device 103 wishes to re-register with the delegating server 102. In this scenario, the delegating server 102 retrieves a unique device identifier associated with a former virtual device, where the former virtual device is related to the same user account and where the former virtual device is not currently being used. Again, the device identifier serves as a representation to service provider 137. In the example shown in FIG. 1B, the delegating server 102 has assigned a first device identifier 155a to Client Device A and a second device identifier 155b to Client Device B. The information may be stored in a database maintained by the delegating server 102. Note that for some embodiments, the application software 113 may be installed on multiple client devices 103. However, the delegating server 102 may be configured to allow the user to execute only one copy of the application software 113 at a time by only allowing one client device to be registered at a time.

The hardware information 146 associated with the client device 103 may comprise information corresponding to a processor of the client device 103, information corresponding to a motherboard of the client device 103, information corresponding to the Basic Input/Output System (BIOS) executing in the client device 103, the media access control (MAC) address, information corresponding to a hard disk identifier, and/or International Mobile Equipment Identity number (IMEI).

Upon receiving the registration data 115 from the client device 103, the delegating server 102 determines whether the user identifier 144 is valid. If the user identifier 144 is valid, the delegating server 102 accesses a database 154 to determine whether the client device 103 has been previously registered. In particular, the delegating server 102 searches the database 154 to determine whether an entry corresponding to the user identifier 144 and hardware information 146 already exists. If the client device 103 was previously registered, the delegating server 102 retrieves the corresponding device identifier from the database 154, and a virtual device environment for the client device 103 is established, thereby allowing the client device 103 to communicate with the service provider 137. Additional details of the registration process are described below.

Once a virtual device environment is established, the delegating server 102 enables communication between the client device 103 and the service provider 137 via a service gateway 119 executing on the delegating server 102. Through the service gateway 119, the client device 103 may receive services provided by the service provider 137 via the application software 113 executing on the client device 103.

Figure 2:
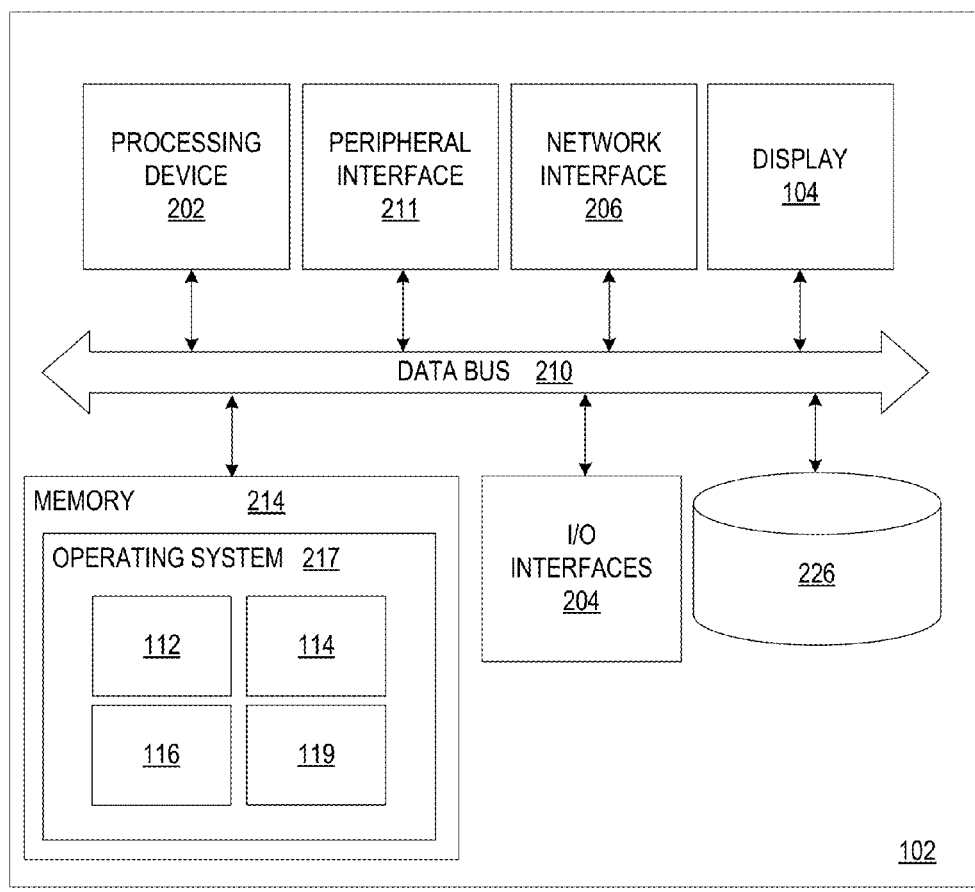
FIG. 2 is a detailed view of the delegating server of FIG. 1A in accordance with various embodiments of the present disclosure.

FIG. 2 is a schematic diagram of the delegating server 102 shown in FIG. 1. The delegating server 102 may be embodied in any one of a wide variety of wired and/or wireless computing devices, such as a desktop computer, portable computer, dedicated server computer, multiprocessor computing device, smartphone, tablet computing device, and so forth. As shown in FIG. 2, the delegating server 102 comprises memory 214, a processing device 202, a number of input/output interfaces 204, a network interface 206, a display 104, a peripheral interface 211, and mass storage 226, wherein each of these devices are connected across a local data bus 210.

The processing device 202 may include any custom made or commercially available processor, a central processing unit (CPU) or an auxiliary processor among several processors associated with the delegating server 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 217, one or more native applications, emulation systems, or emulated applications for any of a variety of operating systems and/or emulated hardware platforms, emulated operating systems, etc.

The applications may include application specific software which may comprise some or all the components (client interface 112, registration module 114, server interface 116, service gateway 119) of the delegating server 102 depicted in FIG. 2. In accordance with such embodiments, the components are stored in memory 214 and executed by the processing device 202. One of ordinary skill in the art will appreciate that the memory 214 can, and typically will, comprise other components which have been omitted for purposes of brevity.

Input/output interfaces 204 provide any number of interfaces for the input and output of data. For example, where the delegating server 102 comprises a personal computer, these components may interface with one or more user input devices via the I/O interfaces 204, where the user input devices may comprise a keyboard or a mouse. The display 104 may comprise a computer monitor, a plasma screen for a PC, a liquid crystal display (LCD), a touchscreen display, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

With further reference to FIG. 2, network interface 206 comprises various components used to transmit and/or receive data over a network environment. For example, the network interface 206 may include a device that can communicate with both inputs and outputs, for instance, a modulator/demodulator (e.g., a modem), wireless (e.g., radio frequency (RF)) transceiver, a telephonic interface, a bridge, a router, network card, etc.). The delegating server 102 may communicate with one or more computing devices via the network interface 206 over the network 118 (FIG. 1). The delegating server 102 may further comprise mass storage 226. The peripheral interface 211 supports various interfaces including, but not limited to IEEE-1394 High Performance Serial Bus (Firewire), USB, a serial connection, and a parallel connection.

Figure 3:
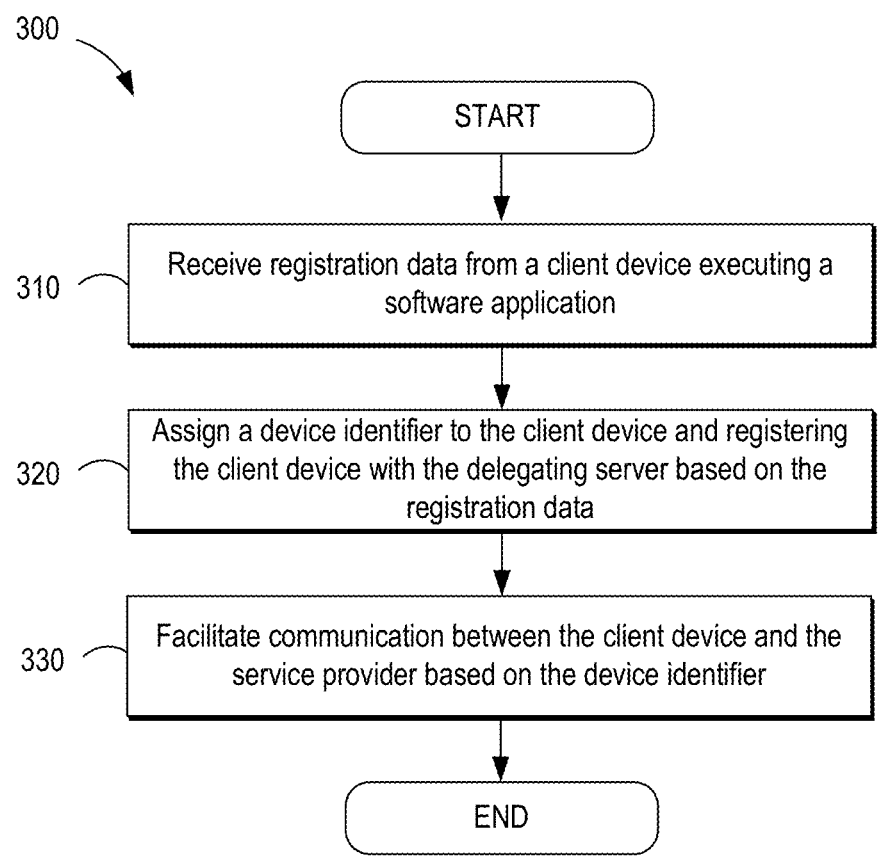
FIG. 3 is a top-level flowchart illustrating examples of functionality implemented as portions of the delegating server of FIG. 1A for facilitating communication between a client device and a service provider according to various embodiments of the present disclosure.

Reference is made to FIG. 3, which is a flowchart 300 in accordance with one embodiment for facilitating communication between a client device 103 (FIG. 1A) and the service provider 137 (FIG. 1A) via a virtual device environment established by the delegating server 102 (FIG. 1A). It is understood that the flowchart 300 of FIG. 3 provides merely an example of the many different types of functional arrangements that may be employed to implement the operation of the various components of the delegating server 102 (FIG. 1A). As an alternative, the flowchart of FIG. 3 may be viewed as depicting an example of steps of a method implemented in the delegating server 102 according to one or more embodiments.

Beginning with block 310, the delegating server 102 (FIG. 1A) receives registration data from a client device 103 (FIG. 1A) executing a software application 113 (FIG. 1B). In block 320, the registration module 114 assigns a device identifier to the client device 103 and registers the client device 103 with the delegating server 102 based on the registration data. In block 330, the service gateway 119 (FIG. 1A) facilitates communication between the client device 103 and the service provider 137 based on the device identifier, where the delegating server 102 is located between the client device 103 and the service provider 137. Through the service gateway 119 in the delegating server 102, the client device 103 may send process requests and/or messages to the service provider 137 through the service gateway 119. Similarly, the service provider 137 may send process responses and/or messages to the client device 103 through the service gateway 119.

Figure 4:
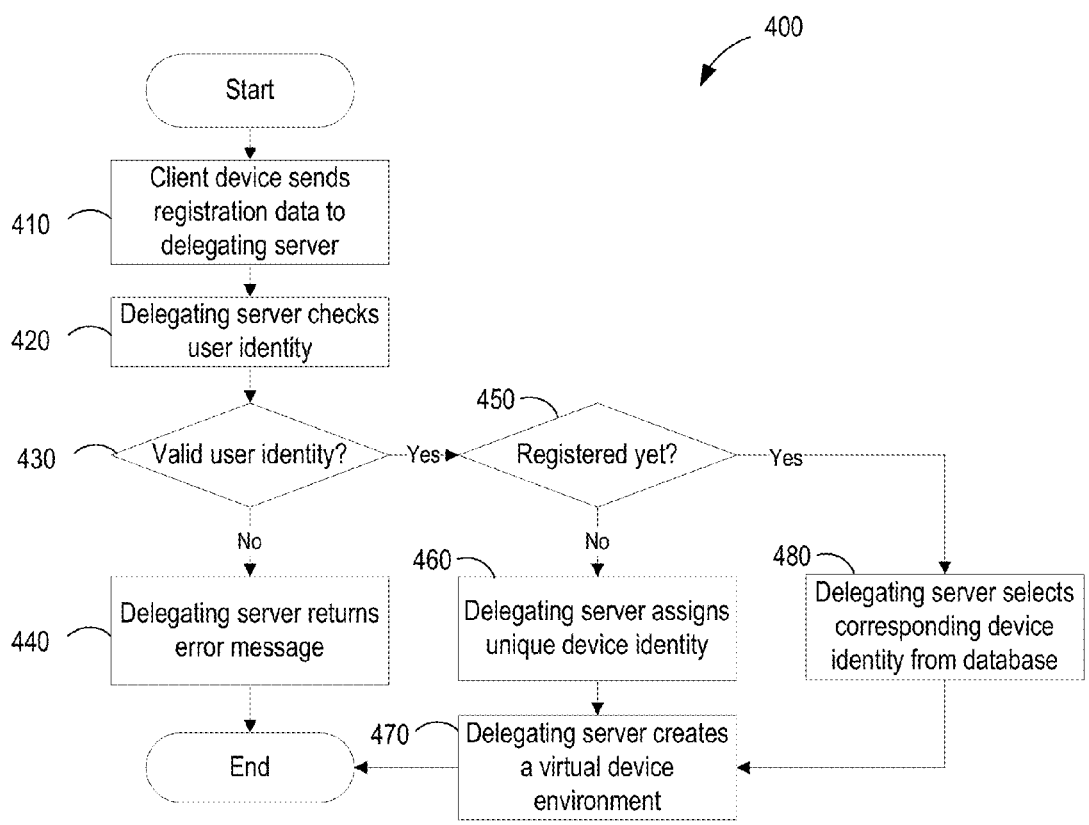
FIG. 4 is a flowchart for the registration process between the client device and the delegating server of FIG. 1A according to various embodiments of the present disclosure.

Reference is made to FIG. 4, which is a flowchart 400 in accordance with one embodiment for the registration process between the client device 103 (FIG. 1A) and the delegating server 102 (FIG. 1A). The registration process allows the client device 103 to receive services from the service provider 137 (FIG. 1A) via a virtual device environment established by the delegating server 102. In block 410, the client device 103 sends registration data 115 (FIG. 1B) to the delegating server 102, where the registration data 115 includes a user identifier 144 (FIG. 1B) and hardware information 146 (FIG. 1B) associated with the client device 103. In block 420, the delegating server 102 checks the user identifier 144 to determine whether the user identifier 144 is a valid one. In particular, the delegating server 102 determines whether the user has permission to access one or more services from the service provider 137 via the application software 113 executing on the client device 103.

In decision block 430, if the user identifier 144 is not valid, the delegating server returns an error message to the client device 103 and denies the registration request from the client device 103 (block 440). The client device 103 is therefore denied access to services from the service provider 137. If the user identity 144 is valid, the delegating server 102 determines whether the client device 103 is already registered with the delegating server 102 (decision block 450).

If the client device 103 is not already registered with the delegating server 102, the delegating server 102 assigns a unique device identity to the client device 103 (block 460), where the unique device identity may comprise a newly generated device identity or a device identity previously generated and no longer being used by another client device 103. In block 470, the delegating server 102 then establishes a virtual device environment for the client device 103 whereby communication between the service provider 137 and the client device 103 is enabled.

Referring back to decision block 450, if the client device 103 is already registered with the delegating server 102, the delegating server 102 retrieves the corresponding device identity from the database 154 (FIG. 1B), and in block 470, the delegating server 102 establishes a virtual device environment for the client device 103 whereby communication between the service provider 137 and the client device 103 is enabled.

Figure 5:
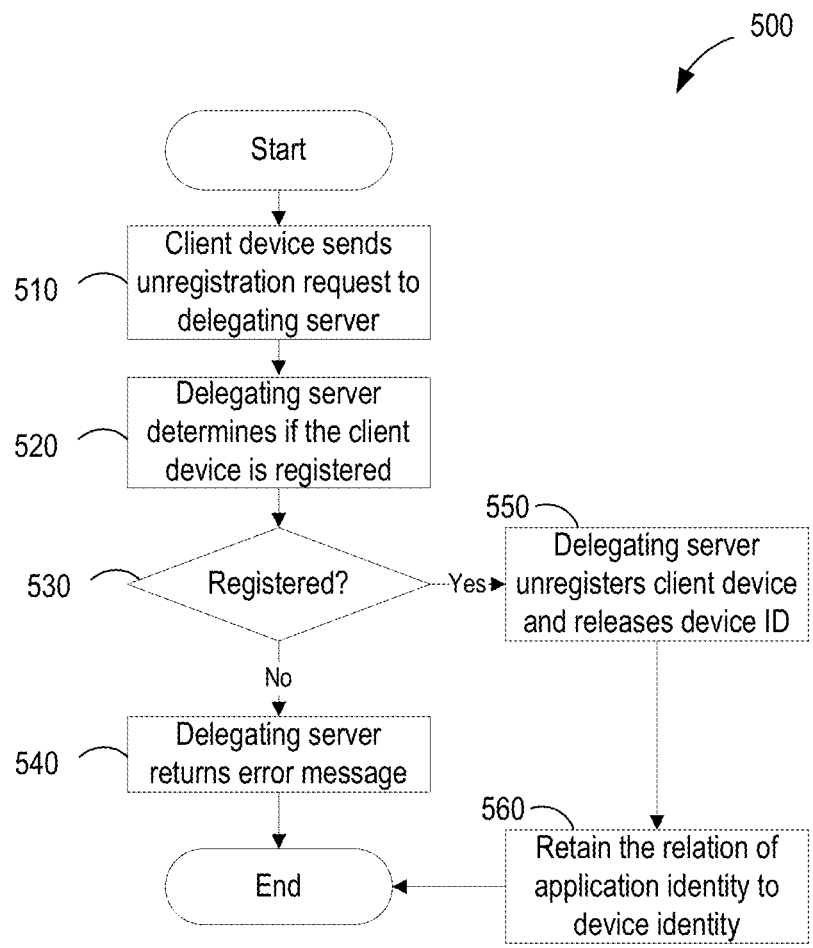
FIG. 5 is a flowchart for an unregistration process between the client device and the delegating server of FIG. 1A according to various embodiments of the present disclosure.

Reference is made to FIG. 5, which is a flowchart 500 in accordance with one embodiment for an unregistration process between the client device 103 (FIG. 1A) and the delegating server 102 (FIG. 1A). The unregistration process is performed when the user elects to no longer receive services from the service provider 137 via the current client device 103. For example, the user may wish to uninstall the application software 113 (FIG. 1B) from the client device 103.

In block 510, the client device 103 sends unregistration data to the delegating server 102, where the unregistration data includes a user identifier 144 (FIG. 1B) and hardware information 146 (FIG. 1B) associated with the client device 103. For some embodiments, when the user uninstalls the application software 113 from the client device 103, this automatically initiates the unregistration process on the delegating server 102. In block 520, the delegating server 102 checks the user identifier 144 to determine whether the user identifier 144 is a valid one.

In decision block 530, if the client device 103 is not already registered, the delegating server returns an error message to the client device 103 (block 540). If the client device 103 is registered with the delegating server 102, the delegating server 102 unregisters the client device 103 and releases the device identity for other client devices to use during the registration process. In block 560, the delegating server 102 may preserve the association between the released device identity and the software application 113 until the device identity is assigned to another client device 103.

Figure 6:
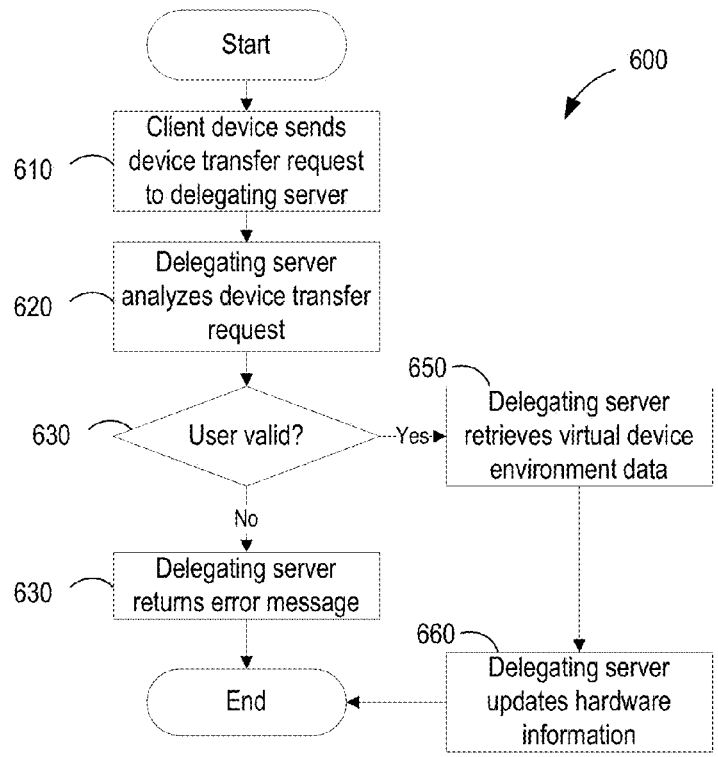
FIG. 6 is a flowchart for a device transfer process according to various embodiments of the present disclosure.
Figure 6:
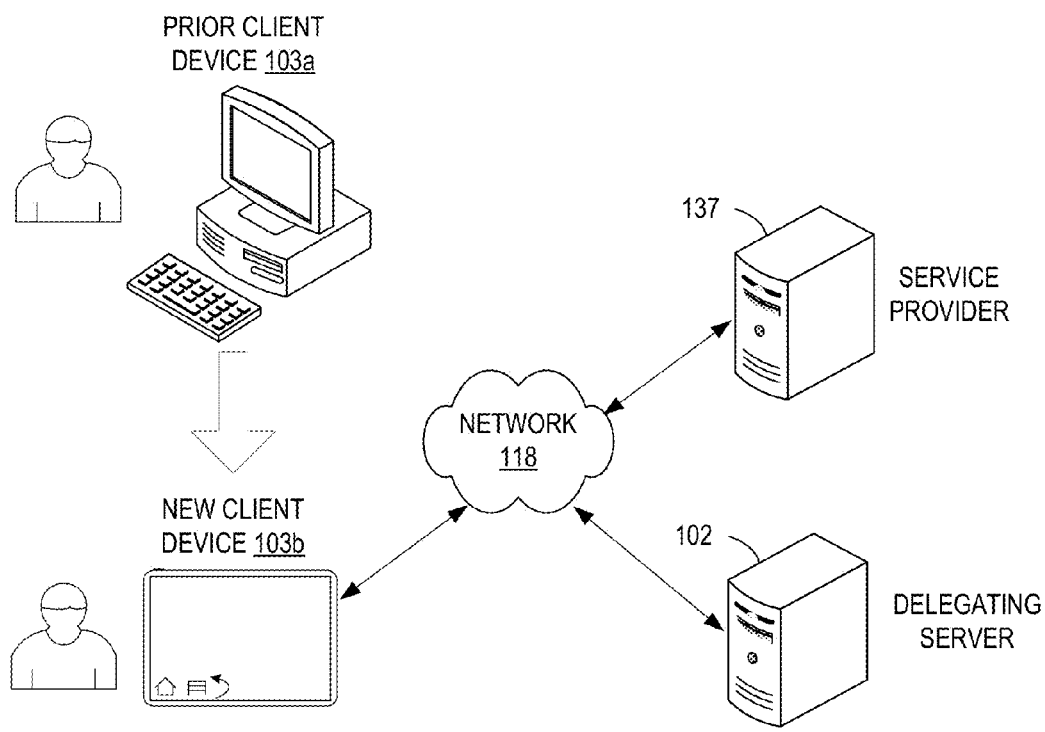

Reference is made to FIG. 6, which is a flowchart 600 in accordance with one embodiment for a device transfer process. The device transfer process is performed when the user wishes to install and execute the software application 113 (FIG. 1B) on a different client device 103b. For example, the user may wish to uninstall the application software 113 (FIG. 1B) from a first client device 103a and install the application software 113 on a different client device 103b comprising a smartphone 109 (FIG. 1A) or a tablet PC 111 (FIG. 1A).

In block 610, the client device 103 sends a device transfer request to the delegating server 102, where the device transfer request includes a user identifier 144 (FIG. 1B) and hardware information 146 (FIG. 1B) associated with the new client device 103. In block 620, the delegating server 102 analyzes the device transfer request. In decision block 630, the delegating server 102 determines if the user identifier 144 is valid. If the user identifier 144 is not valid, the delegating server returns an error message to the client device 103 (block 630). If the user identifier 144 is valid, the delegating server 102 accesses the database 154 (FIG. 1B) and retrieves the hardware information 146 (FIG. 1B) previously associated with the user identifier 144 and updates the entry with hardware information associated with the new client device 103 (block 660).

Figure 7:
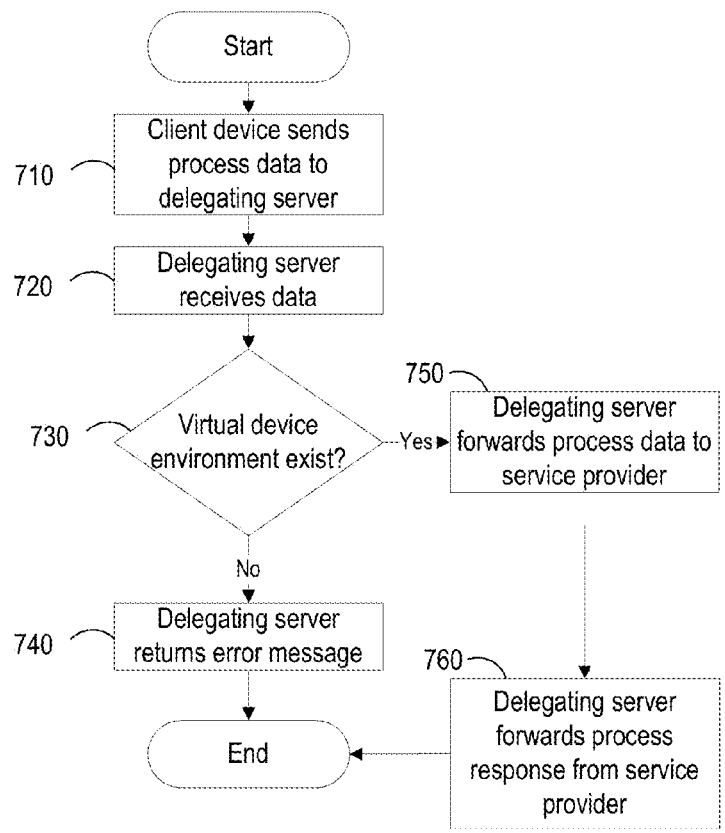
FIG. 7 is a flowchart for facilitating communication between the client device and the service provider by the delegating server in FIG. 1A according to various embodiments of the present disclosure.
Figure 7:
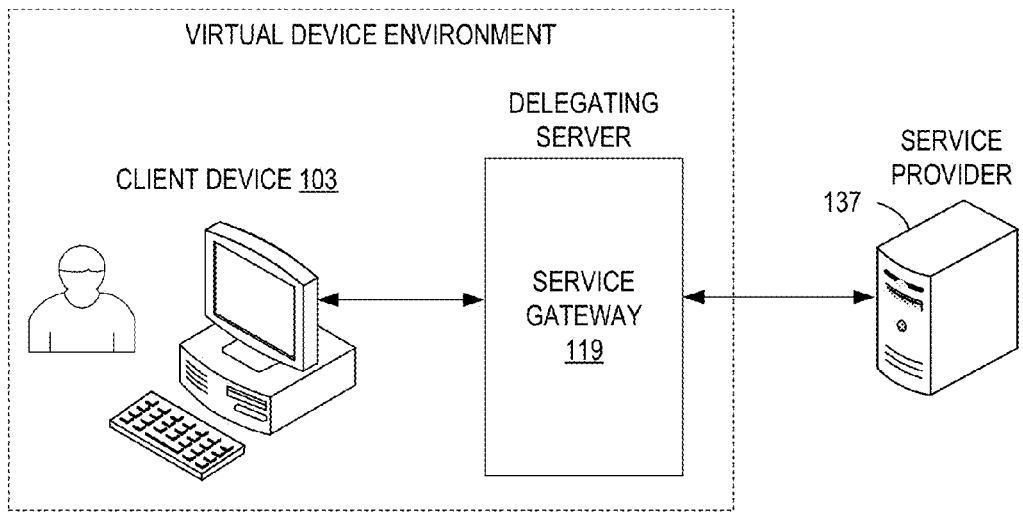

Reference is made to FIG. 7, which is a flowchart 700 in accordance with one embodiment for facilitating communication between the client device 103 (FIG. 1A) and the service provider 137 (FIG. 1A) by the delegating server 102 (FIG. 1A). The communication channel established by the delegating server 102 allows the client device 103 to interact with the service provider 137 and to receive services from the service provider.

In block 710, the client device 103 sends process data from the software application 113 (FIG. 1B) to the delegating server 102, where the process data may comprise process requests and/or messages intended for the service provider 137. For some embodiments, when the user executes a particular function or feature in the application software 113 on the client device 103, process data is automatically sent to the delegating server 102. In block 720, the delegating server 102 receives the process data and identifies the user associated with the client device 103. In decision block 730, the delegating service 730 determines if a virtual device environment has been established for the client device 103 that sent the process data.

If a virtual device environment has not been established for the client device 103 that sent the process data, the delegating server returns an error message to the client device 103 (block 740). If a virtual device environment has been established for the client device 103, the delegating server 102 forwards the process data received from the client device 103 to the service provider 137 (block 750). In block 760, the delegating server 102 forwards the process response from the service provider 137 to the client device 103.

In the illustrations provided above, a user associated with a single client device in communication with a delegating server and single service provider is depicted. However, as noted above, this is not meant to be limiting and other configurations involving multiple client devices, delegating servers, and client servers may be incorporated for other embodiments.

Figure 8:
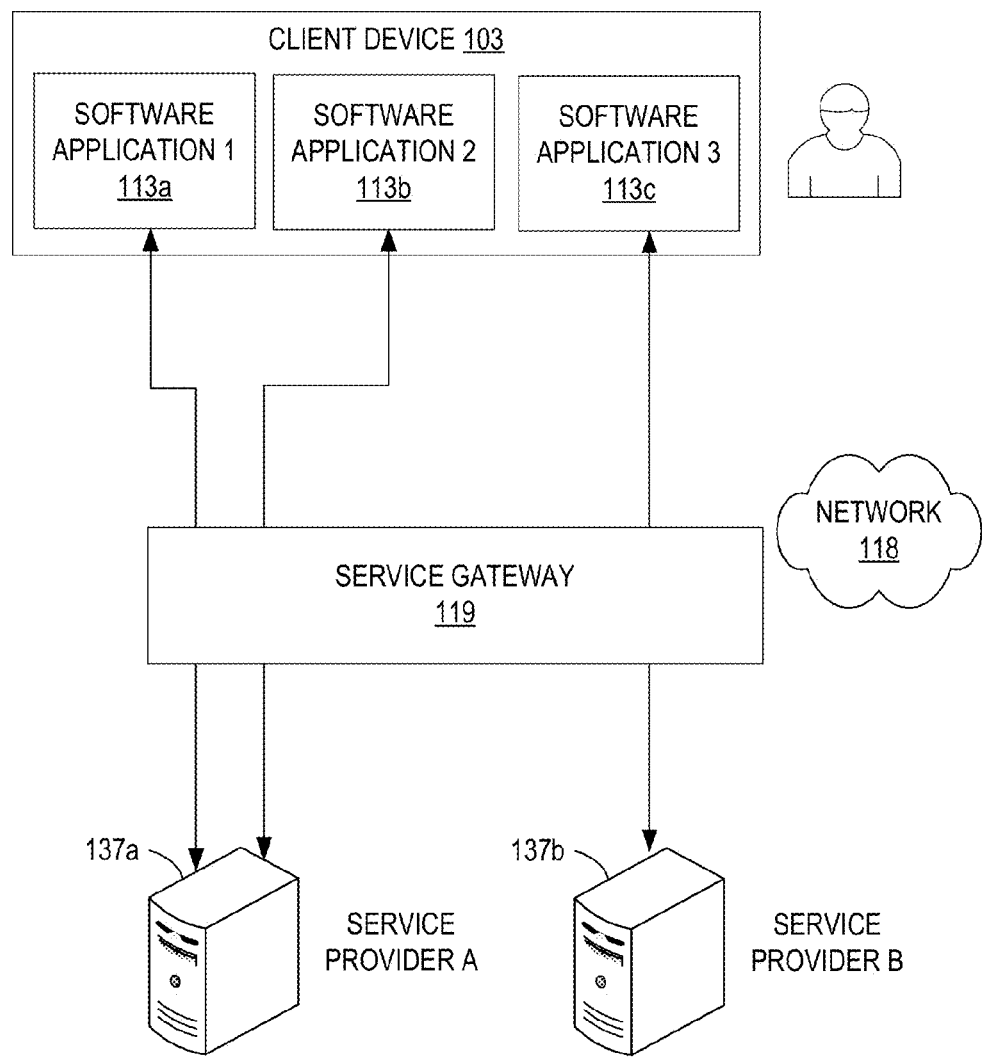
FIG. 8 illustrates a configuration whereby multiple software applications executing on a client device are in communication with multiple service providers via the delegating server according to various embodiments of the present disclosure.

FIG. 8 illustrates a configuration whereby multiple software applications 113a, 113b, 113c executing on a single client device 103 are in communication with multiple service providers 137a, 137b via the delegating server 102 (FIG. 1A) according to various embodiments of the present disclosure. In the example shown, a single client device executes multiple software applications 113a, 113b, 113c where service is provided by two service providers 137a, 137b. The service gateway 119 in a delegating server 102 establishes multiple virtual device environments for the client device 103 and enables communication between the client device 103 and the service providers 137a, 137b. In the example shown, two software applications 113a, 113b receive services from a first service provider 137a while the third software application 113c receives services from a second service provider 137b. Note that other configurations involving multiple client devices and/or multiple delegating servers may be implemented as well.

Figure 9:
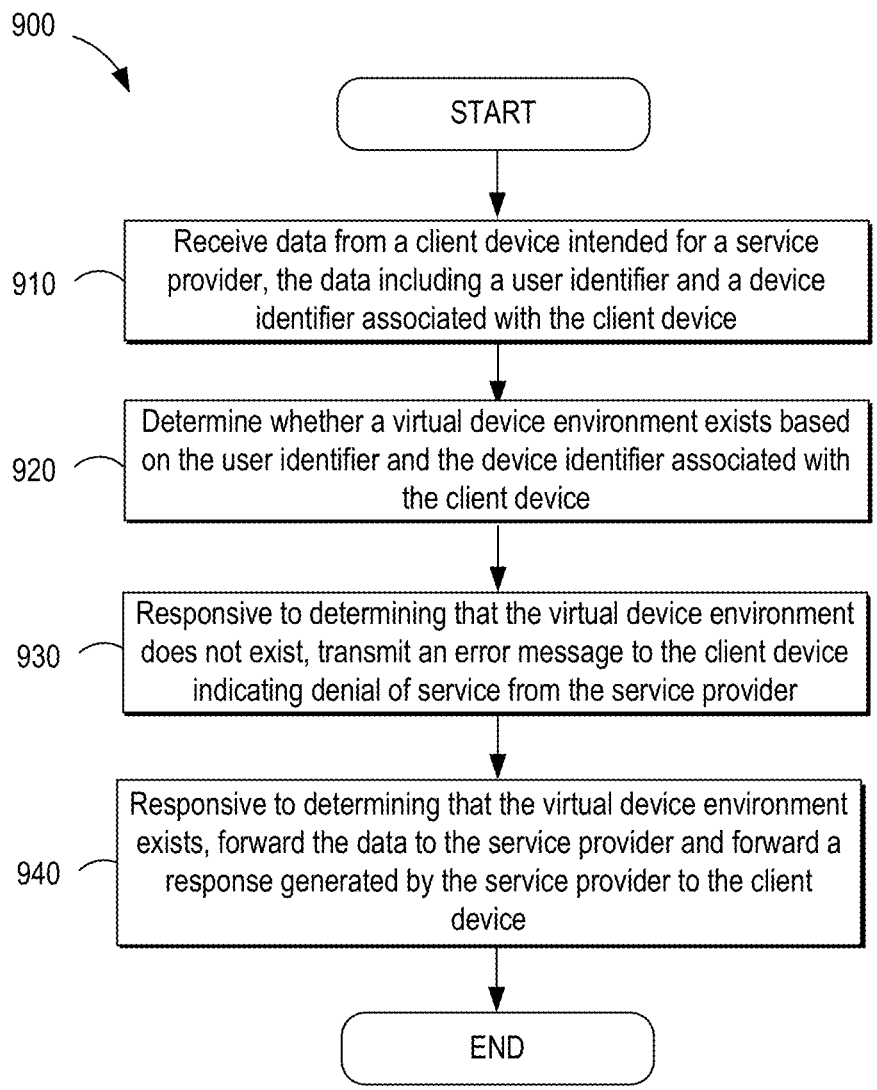
FIG. 9 is a top-level flowchart illustrating examples of functionality implemented as portions of the delegating server of FIG. 1A for facilitating communication between a client device and a service provider according to an alternative embodiment of the present disclosure.

Reference is made to FIG. 9, which is a flowchart 900 in accordance with an alternative embodiment for facilitating communication between a client device 103 (FIG. 1A) and the service provider 137 (FIG. 1A) via a virtual device environment established by the delegating server 102 (FIG. 1A). It is understood that the flowchart 900 of FIG. 9 provides merely an example of the many different types of functional arrangements that may be employed to implement the operation of the various components of the delegating server 102 (FIG. 1A). As an alternative, the flowchart of FIG. 9 may be viewed as depicting an example of steps of a method implemented in the delegating server 102 according to one or more embodiments.

Beginning with block 910, the delegating server 102 receives data from a client device 103 intended for a service provider 137, the data including a user identifier and a device identifier associated with the client device 103. In block 920, the delegating server 102 determines whether a virtual device environment exists based on the user identifier and the device identifier associated with the client device 103. In block 930, the delegating server 102 transmits an error message to the client device 103 indicating denial of service from the service provider 137 in response to determining that the virtual device environment does not exist.

In block 940, the delegating server 102 forwards the data to the service provider 137 and forwards a response generated by the service provider 137 to the client device 103 in response to determining that the virtual device environment exists. In accordance with some embodiments, the delegating server 102 server forwards the data to the service provider 137 by wrapping or embedding information from the client device 103 intended for the service provider 137 in the form of a request, where wrapping the information is performed by the delegating server 102 using the device identifier. The delegating server 102 then transmits the request to the service provider 137.

In response to receiving the request, the service provider 137 retrieves data according to the embedded information and transmits a response to the delegating server 102. For some embodiments, the delegating server 102 forwards the response generated by the server 137 to the client device 103 by unwrapping the response from the service provider to obtain the data retrieved by the server 137, where the data may comprise, for example, license data intended for the client device 103. The delegating server 102 then transmits the data (e.g., license data) to the client device 103.

Figure 10:
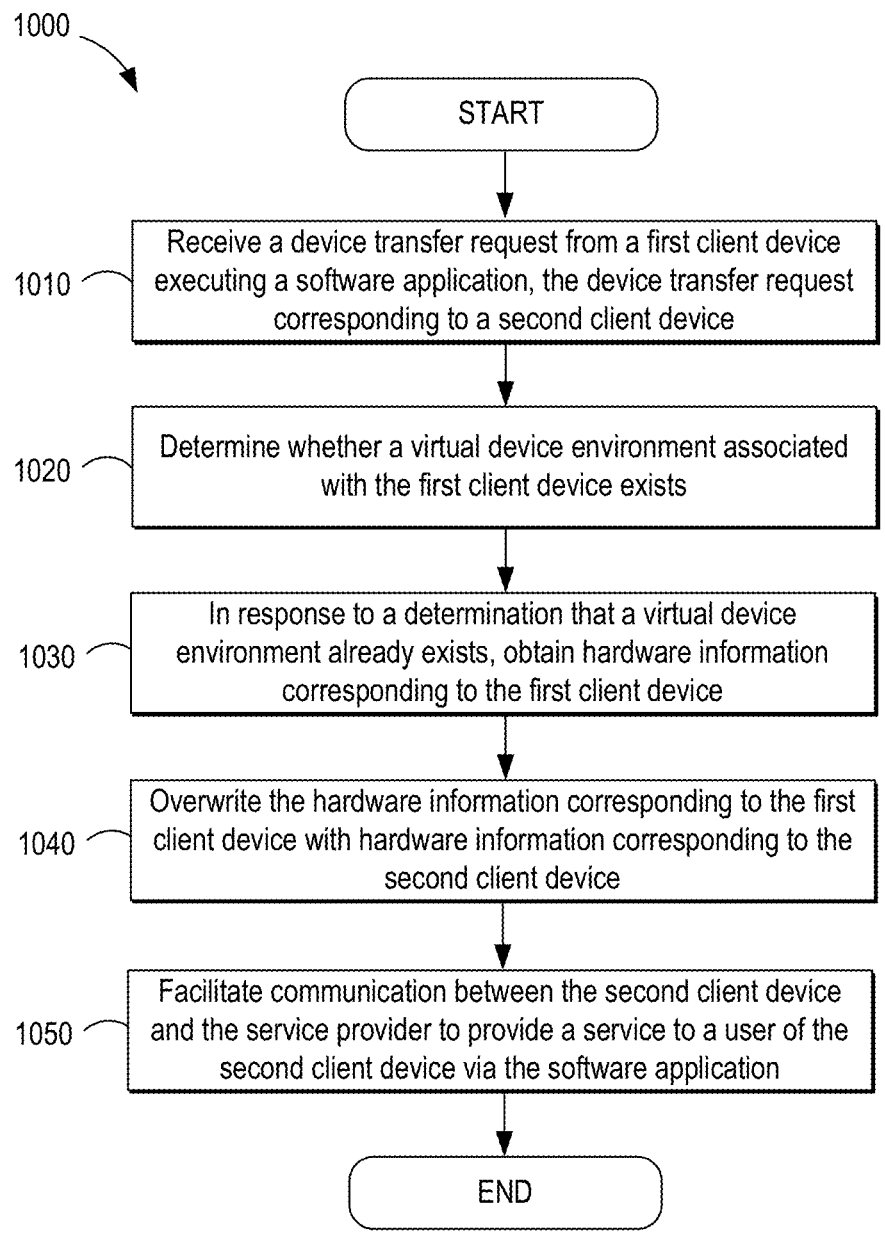
FIG. 10 is a top-level flowchart illustrating examples of functionality implemented as portions of the delegating server of FIG. 1A for allowing a user to execute a software application on a different client device according to various embodiments of the present disclosure.

Reference is made to FIG. 10, which is a flowchart 1000 in accordance with an alternative embodiment for facilitating communication between a client device 103 (FIG. 1A) and the service provider 137 (FIG. 1A) via a virtual device environment established by the delegating server 102 (FIG. 1A). In particular, flowchart 1000 illustrates the steps performed when a user wishes to execute a software application on a different client device. It is understood that the flowchart 1000 of FIG. 10 provides merely an example of the many different types of functional arrangements that may be employed to implement the operation of the various components of the delegating server 102 (FIG. 1A). As an alternative, the flowchart of FIG. 10 may be viewed as depicting an example of steps of a method implemented in the delegating server 102 according to one or more embodiments.

Beginning with block 1010, the delegating server 102 receives a device transfer request from a first client device 103 executing a software application, the device transfer request corresponding to a second client device, wherein the device transfer request comprises an identifier corresponding to the user and information corresponding to hardware in the second client device. In block 1020, the delegating server 102 determines whether a virtual device environment for the first client device 103 exists. In block 1030, the delegating server 102 obtains hardware information corresponding to the first device in response to a determination that a virtual device environment already exists.

In block 1040, the delegating server 102 overwrites the hardware information corresponding to the first client device 103 with hardware information corresponding to the second client device. In block 1050, the delegating server facilitates communication between the second client device and the service provider 137 to provide a service to a user of the second client device via the software application, where the delegating server 102 is located between the service provider 137 and the second client device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A method implemented in a delegating server for binding a device identity to a software application, comprising:
   receiving registration data from a client device executing a software application, wherein the registration data comprises a user identifier corresponding to a user of the software application and information corresponding to hardware in the client device;
   processing the user identifier to determine whether the user has permission to access at least one service from a service provider using the software application;
   determining that the user identifier is valid in response to determining that the user has permission to access at least one service;
   in response to determining that the user is valid, assigning a device identifier to the client device and registering the client device with the delegating server based on the registration data, wherein the device identifier is allocated by the delegating server and is utilized by the service provider to distinguish between different client devices; and
   facilitating communication between the client device and the service provider based on the device identifier, wherein the delegating server is communicatively coupled to the client device through the service provider.

2. The method of claim 1, wherein facilitating communication between the client device and the service provider comprises:
   embedding information from the client device intended for the service provider in a request, wherein embedding the information is performed using the device identifier; and
   transmitting the request to the service provider.

3. The method of claim 2, wherein responsive to receiving the request, the service provider retrieves data according to the embedded information and transmits a response to the delegating server.

4. The method of claim 3, wherein the embedded information comprises an identifier for protected media content to be decrypted by the client device, and wherein the retrieved data comprises license data for allowing the client device to decrypt the protected media content.

5. The method of claim 4, wherein facilitating communication between the client device and the service provider further comprises:
   unwrapping the response from the service provider to obtain the license data; and
   transmitting the license data to the client device.

6. The method of claim 1, wherein assigning the identity to the client device based on the registration data comprises:
   in response to determining that the user identifier is valid, determining whether the user identifier is registered with the delegating server and assigning a unique identity to the client device if the user identifier is not registered; and
   in response to determining that the user identifier is invalid, communicating an error message to the client device.

7. The method of claim 1, wherein the information corresponding to the hardware in the client device comprises at least one of: information corresponding to a processor of the client device; information corresponding to a motherboard of the client device; and information corresponding to a Basic Input/Output System (BIOS) executing in the client device.

8. The method of claim 1, wherein the identifier corresponding to the user comprises at least one of: a license identifier corresponding to the software application; and account information corresponding to the user.

9. The method of claim 1, further comprising:
   responsive to receiving an unregistration request from the user, performing the steps of:
   determining whether a virtual device environment exists based on the user identifier and the hardware information associated with the client device;
   responsive to determining that the virtual device environment does not exist, transmitting an error message to the client device; and
   responsive to determining that the virtual device environment exists, unregistering the client device with the delegating server and retaining information defining a relationship between the client device and the software application.

10. The method of claim 9, wherein unregistering the client device with the delegating server comprises uninstalling the application software from the client device.

11. The method of claim 9, wherein upon unregistering the client device with the delegating server, the application software remains installed on the client device.

12. The method of claim 9, further comprising: releasing the client device identifier.

13. The method of claim 1, wherein the identity assigned to the client device comprises one of: a new device identity; and a previously used client device identity of a currently unregistered client device.

14. The method of claim 1, further comprising:
receiving a device transfer request from the client device for a new client device;
determining whether the user identifier is valid;
in response to determining that the user identifier is valid, assigning a previously used client device identity to the new client device and communicating the device identity of the new client device to the service provider; and
in response to determining that the user identifier is invalid, communicating an error message to the client device.

15. A method implemented in a delegating server for binding a device identity to a software application, comprising:
receiving data from a client device intended for a service provider, the data including a user identifier and a device identifier associated with the client device, wherein the device identifier is allocated by the delegating server and is utilized by the service provider to distinguish between different client devices;
determining whether a virtual device environment exists based on the user identifier and the device identifier associated with the client device, wherein determining whether the virtual device environment exists is based on a user of the client device having permission to access at least one service from the service provider using the software application and existence of an entry corresponding to the user identifier and the device identifier in a database maintained by the delegating server;
responsive to determining that the virtual device environment does not exist, transmitting an error message to the client device indicating denial of service from the service provider; and
responsive to determining that the virtual device environment exists, forwarding the data to the service provider and forwarding a response generated by the service provider to the client device.

16. A system for providing services to a client device, comprising:
a processor;
a client interface executed in the processor for receiving registration data from a client device executing a software application, wherein the registration data comprises a user identifier corresponding to a user of the software application and information corresponding to hardware in the client device;
a registration module executed in the processor for processing the user identifier to determine whether the user has permission to access at least one service from a service provider using the software application; determining that the user identifier is valid in response to determining that the user has permission to access at least one service; and in response to determining that the user is valid, assigning a device identity to the client device and registering the client device with the delegating server based on the registration data, wherein the device identifier is utilized by the service provider to distinguish between different client devices;
a server interface executed in the processor for communicating the device identity to the server provider; and
a service gateway executed in the processor for enabling communication of data between the client device and the service provider, wherein the service gateway forwards data between the client device and the service provider upon the server interface communicating the device identity to the service provider.

17. The system of claim 16, wherein the registration data comprises an identifier corresponding to the user and information corresponding to hardware in the client device.

18. The system of claim 17, wherein the registration module assigns the identity to the client device based on the registration data by determining whether the user identifier is valid;
wherein the registration module determines whether the user identifier is registered with the delegating server in response to determining that the user identifier is valid; and
wherein the client interface communicates an error message to the client device in response to the registration module determining that the user identifier is invalid; and
wherein the registration module assigns a unique identity to the client device in response to the user identifier not being registered.

19. The system of claim 16, wherein the data forwarded by the service gateway comprises at least one of: process requests from the software application executing in the client device; and process responses from the service provider.

* * * * *